UNITED STATES PATENT OFFICE.

JAMES QUARTERMAN, OF FLUSHING, ASSIGNOR TO ADALINE M. INGERSOLL, OF BROOKLYN, AND FREDK. J. J. QUARTERMAN AND ELIZABETH QUARTERMAN, OF FLUSHING, NEW YORK.

IMPROVEMENT IN PAINT COMPOUNDS.

Specification forming part of Letters Patent No. 143,841, dated October 21, 1873; application filed April 16, 1873.

*To all whom it may concern:*

Be it known that I, JAMES QUARTERMAN, of Flushing, in the county of Queens and State of New York, have invented certain Improvements in Liquid Paints; and I hereby declare the following to be a full and exact description thereof.

My invention consists in certain details of ingredients and proportions, as more fully hereinafter described.

By using the following formulas and mixtures I produce a very cheap and good paint.

Formula A.—Take nine gallons of water and eight pounds of soda-soap; dissolve by heat, and use hot.

Formula B.—Take nine gallons of water; two and one-fourth pounds of sal-soda or borax; four ounces gum-shellac; two and one-half pints of molasses, or three pounds of sugar; dissolve by heat, but to be used cold.

Formula C.—In order to mix paint for inside use, take one hundred pounds of best French zinc or white lead ground in linseed-oil; four gallons boiled linseed-oil; one gallon japan-varnish; two pounds of patent drier; one-half ounce ultramarine blue; two gallons of turpentine; four gallons of formula B; two gallons of formula A. Mix these well together, and the paint will be ready for use and to be put up in tin cans for shipment.

By the addition to these formulas of the various pigments, different colors can be produced, according to desire.

Between my improved paint and the liquid paints now in use there exists a very marked difference. For instance, it is now the custom of the manufacturers of such paints to use sulphate of zinc and acetate of lead, and in such cases these ingredients change their chemical bases when dissolved in water, and settle to the bottom when allowed to stand in cans; hence directions are given by Averill to "stir well before using." Again, the silicate of soda and lime, which are now used in liquid paints, change their chemical bases when mixed in water and brought into contact with the acetate of lead and sulphate of zinc. The lime used by Averill takes up all the excess of pyroligneous acid left in the mixture, which came from the acetate of lead, and will be changed to the acetate of lime and form crystals, which will be seen like small specks in the paint when laid on with a brush. In the meantime the silicate of soda used by the present manufacturers of liquid paints will take up any excess of the sulphuric acid which came from the sulphate of zinc; they also use and will change to the sulphate of soda or glauber salts.

My liquid paint, freed from the objectionable ingredients, does not settle in the cans, but keeps a uniform thickness throughout; for I only use one alkali, and that is the simple carbonate of soda mollified by molasses or sugar, so as not to saponify the oil; and by using no acid or saline solution my liquid paint is homogeneous and uniform, and will keep in cans for years without separating and settling at the bottom. Other liquid paints have to be ground before and after mixing. My paint is ready for use as soon as it is mixed, thus effecting a great saving of time and labor.

Having thus described my invention, what I claim as new, and desire to secure by Letters Patent, is—

As a new article of manufacture, a liquid paint composed of the ingredients herein described in formulas A B C, and compounded and prepared in the manner specified.

JAMES QUARTERMAN.

Witnesses:
ISAAC BLOODGOOD,
HENRY CLEMENT.